(12) United States Patent
Lee et al.

(10) Patent No.: US 9,855,834 B2
(45) Date of Patent: Jan. 2, 2018

(54) AIR CONDITIONER SYSTEM OF A VEHICLE

(71) Applicant: LG ELECTRONICS INC., Seoul (KR)

(72) Inventors: Junggu Lee, Seoul (KR); Seungdo Han, Seoul (KR); Ikseo Park, Seoul (KR); Junghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/141,995

(22) Filed: Apr. 29, 2016

(65) Prior Publication Data
US 2016/0325597 A1     Nov. 10, 2016

(30) Foreign Application Priority Data

May 6, 2015   (KR) .................. 10-2015-0062967

(51) Int. Cl.
*B60H 1/00*     (2006.01)
*B60K 6/387*    (2007.10)
(Continued)

(52) U.S. Cl.
CPC ........... *B60K 6/485* (2013.01); *B60H 1/3222* (2013.01); *B60K 6/387* (2013.01); *B60K 6/405* (2013.01); *F02N 11/003* (2013.01); *F02N 11/0814* (2013.01); *F25B 27/00* (2013.01); *F25B 31/008* (2013.01); *B60H 2001/3266* (2013.01); *B60H 2001/3294* (2013.01); *B60Y 2200/92* (2013.01); *B60Y 2300/42* (2013.01); *B60Y 2300/45* (2013.01); *B60Y 2300/60* (2013.01); *B60Y 2306/05* (2013.01); *B60Y 2400/88* (2013.01); *B60Y 2410/10* (2013.01); *F25B 31/02* (2013.01); *F25B 2327/001* (2013.01); *Y10S 903/914* (2013.01); *Y10S 903/93* (2013.01); *Y10S 903/951* (2013.01); *Y10S 903/952* (2013.01)

(58) Field of Classification Search
CPC ........ B60K 6/485; B60K 6/387; B60K 6/405; B60H 1/3222; F02N 11/003; F02N 11/0814; F25B 27/00; F25B 31/008
See application file for complete search history.

(56) References Cited

U.S. PATENT DOCUMENTS

| | | | |
|---|---|---|---|
| 5,724,941 A * | 3/1998 | Suzuki | B60H 1/00978 123/339.15 |
| 6,375,436 B1 * | 4/2002 | Irie | F04B 35/002 417/223 |

(Continued)

FOREIGN PATENT DOCUMENTS

| | | |
|---|---|---|
| JP | 2000-130323 A | 5/2000 |
| JP | 2004-108328 A | 4/2004 |

(Continued)

*Primary Examiner* — Viet Nguyen
(74) *Attorney, Agent, or Firm* — Birch, Stewart, Kolasch & Birch, LLP

(57) ABSTRACT

A vehicle having an integrated function of assisting an engine and compressing a refrigerant includes a motor unit and a compression unit coupled within a housing, and a first clutch unit coupled to a rotation shaft of the motor unit or a rotation shaft of the compression unit and that connects or releases a driving force of an engine and a driving force of the motor unit.

18 Claims, 11 Drawing Sheets

(51) Int. Cl.
*B60K 6/405* (2007.10)
*B60K 6/485* (2007.10)
*F02N 11/00* (2006.01)
*F02N 11/08* (2006.01)
*B60H 1/32* (2006.01)
*F25B 31/00* (2006.01)
*F25B 27/00* (2006.01)
*F25B 31/02* (2006.01)

(56) References Cited

U.S. PATENT DOCUMENTS

| | | | | |
|---|---|---|---|---|
| 6,796,138 | B1* | 9/2004 | Imai | B60H 1/3208 417/16 |
| 7,263,828 | B2* | 9/2007 | Iwanami | F01C 13/00 290/43 |
| 2002/0078700 | A1* | 6/2002 | Kelm | B60H 1/3222 62/236 |
| 2002/0108384 | A1 | 8/2002 | Higashiyama | |
| 2004/0055305 | A1* | 3/2004 | Kuroda | B60H 1/00735 60/698 |
| 2004/0079098 | A1* | 4/2004 | Uno | B60H 1/322 62/236 |
| 2004/0172955 | A1* | 9/2004 | Runk | B60H 1/322 62/133 |
| 2004/0178636 | A1* | 9/2004 | Iwanami | B60H 1/3222 290/40 C |
| 2004/0221594 | A1* | 11/2004 | Suzuki | B60H 1/3208 62/236 |
| 2005/0257926 | A1* | 11/2005 | Turner | B60H 1/3222 165/202 |
| 2007/0187953 | A1* | 8/2007 | Park | B60H 1/3222 290/28 |
| 2011/0113809 | A1 | 5/2011 | Adaniya et al. | |
| 2012/0055175 | A1* | 3/2012 | Ting | B60H 1/3222 62/61 |
| 2012/0262881 | A1* | 10/2012 | Onimaru | B60L 3/003 361/701 |
| 2015/0151848 | A1* | 6/2015 | Gagne | B64D 13/006 244/58 |
| 2016/0325597 | A1 | 11/2016 | Lee et al. | |

FOREIGN PATENT DOCUMENTS

| | | |
|---|---|---|
| JP | 2004-203147 A | 7/2004 |
| JP | 2012-235670 A | 11/2012 |
| KR | 10-2008-0030752 A | 4/2008 |
| KR | 10-1632176 B1 | 6/2016 |
| WO | 03/02610 A1 | 3/2003 |

* cited by examiner

AIR CONDITIONER SYSTEM OF A VEHICLE

This non-provisional application claims the benefit under 35 U.S.C. §119(a) to Patent Application No. 10-2015-0062967, filed in the Republic of Korea on May 6, 2015, the entire contents of which are hereby expressly incorporated by reference into the present application.

BACKGROUND OF THE INVENTION

Field of the Invention

The present invention relates to a vehicle, and more particularly, to a vehicle in which a motor is installed that assists an engine.

Description of the Related Art

In general, in a hybrid vehicle, an Idle Stop and Go (ISG) function may enhance the economic efficiency of fuel usage by repeating turning off and turning on operations of an engine. A vehicle having an ISG function has an effect that enhances fuel consumption by 5-15%.

A vehicle having an ISG function performs initial starting of an engine and converts from Idle Stop to Idle Go using an ISG motor that transfers power to a flywheel.

When initial starting of the engine or restarting of the engine according to conversion from Idle Stop to Idle Go is required, the ISG motor is driven with a battery current to return power to a flywheel, thereby starting the engine.

In a hybrid vehicle, a compressor is typically installed which is one component of an air conditioner that cools air within the vehicle. The compressor is driven with the battery current to compress a refrigerant.

However, in a conventional hybrid vehicle, because an ISG motor and a compressor are separately provided, there is a problem that the component number increases, a cost increases, and a weight of a power train increases.

SUMMARY OF THE INVENTION

The present invention has been made in view of the above problems, and provides a vehicle having an integrated function of assisting an engine and compressing a refrigerant, and an integrated driving device where a motor and a compressor are integrally provided in the same housing.

The object of the present invention is not limited to the above-described objects and the other objects will be understood by those skilled in the art from the following description.

In accordance with an aspect of the present invention, a vehicle includes: an engine; a housing having a motor unit receiving space and a compression unit receiving space therein; a motor unit disposed at the motor unit receiving space; a compression unit disposed at the compression unit receiving space and coupled to a rotation shaft of the motor unit and that compresses a refrigerant using at least one of a driving force of the engine and a driving force of the motor unit; and a first clutch unit coupled to a rotation shaft of the motor unit or a rotation shaft of the compression unit and that connects or releases a driving force of the engine and a driving force of the motor unit.

The detailed matters of the embodiments will be included in the detailed description and the drawings.

In a vehicle according to an exemplary embodiment of the present invention, fuel consumption is improved.

Further, even when an engine is stopped, air within the vehicle can be cooled.

Further, heat of a motor unit can be cooled using a refrigerant of a compression unit.

The effect of the present invention is not limited to the above-described effects and other objects will be understood by those skilled in the art from the claims.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Figure 1:
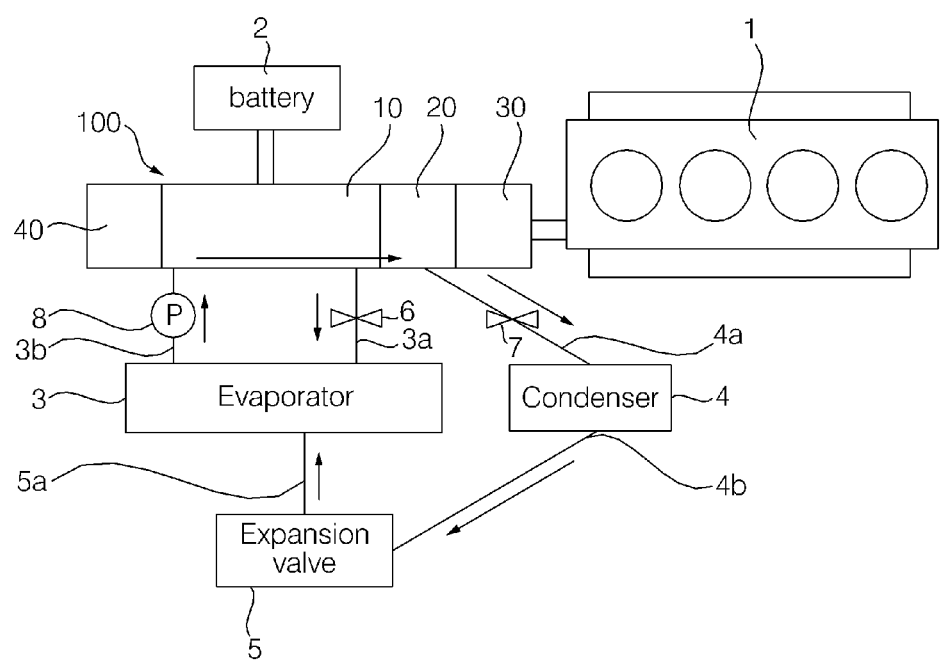
FIG. 1 is a block diagram illustrating a vehicle according to a first exemplary embodiment of the present invention.

These advantages and features of the present invention and a method of accomplishing them will become more readily apparent from the detailed description given hereinafter together with the accompanying drawings. However, it should be understood that the detailed description and specific examples while indicating preferred embodiments of the invention are given by way of illustration only since various changes and modifications within the spirit and scope of the invention will become apparent to those skilled in the art from this detailed description. Like reference numerals designate like elements throughout the specification.

Hereinafter, a vehicle according to exemplary embodiments of the present invention will be described with reference to the drawings.

FIG. 1 is a block diagram illustrating a vehicle according to a first exemplary embodiment of the present invention.

Referring to FIG. 1, a vehicle according to a first exemplary embodiment of the present invention includes a driving device 100. The driving device 100 of the vehicle includes a motor unit (motor) 10, a compression unit (compressor) 20 disposed at one side of the motor unit 10 to compress a refrigerant, and a first clutch unit (first clutch) 30 disposed at one side of the compression unit 20. At the other side of the motor unit 10, an inverter 40 that controls the motor unit 10 may be installed. The inverter 40 may control a rotation speed and a rotation direction of a rotation shaft of the motor unit 10.

The compression unit 20 is disposed between the motor unit 10 and the first clutch unit 30. One end of the rotation shaft of the compression unit 20 may be coupled to the rotation shaft of the motor unit 10, and the other end thereof may be coupled to a rotation shaft of the first clutch unit 30.

The first clutch unit 30 may be connected to a flywheel of an engine 1 through a belt. The first clutch unit 30 performs a function of connecting power between the rotation shaft of the compression unit 20 and the flywheel of the engine 1 or performs a function of releasing a connection thereof. That is, the first clutch unit 30 may transfer a driving force of the motor unit 10 to the engine 1 by connect or releasing a driving force of the motor unit 10 and may transfer a driving force of the engine 1 to the motor unit 10 by connect or releasing a driving force of the engine 1.

When the motor unit 10 is operated, the compression unit 20 is driven by a driving force of the motor unit 10 to compress a refrigerant. Further, in a state in which the first clutch unit 30 connects power between the rotation shaft of the compression unit 20 and the flywheel of the engine 1, when the engine 1 is operated, the compression unit 20 is driven by a driving force of the engine 1 to compress a refrigerant.

When a current of a battery 2 is supplied, the motor unit 10 may be operated. Further, in a state in which the first clutch unit 30 connects power between the rotation shaft of the compression unit 20 and the flywheel of the engine 1, when the engine 1 is operated, the motor unit 10 is driven by a driving force of the engine 1 to generate a current, thereby charging the battery 2.

The motor unit 10 is connected to an evaporator 3 through a first refrigerant pipe 3a and through a third refrigerant pipe 3b. Further, the compression unit 20 is connected to a condenser 4 through a second refrigerant pipe 4a. A first valve 6 is installed in the first refrigerant pipe 3a that opens and closes the first refrigerant pipe 3a. A second valve 7 is installed in the second refrigerant pipe 4a that opens and closes the second refrigerant pipe 4a. A pump 8 is installed in the third refrigerant pipe 3b that pumps a refrigerant from the evaporator 3 into the motor unit 10.

The condenser 4 is connected to an expansion valve 5 through a fourth refrigerant pipe 4b, and the expansion valve 5 is connected to the evaporator 3 through a fifth refrigerant pipe 5a.

When the first valve 6 is closed and the second valve 7 is opened, a refrigerant compressed within the compression unit 20 is moved to the condenser 4 through the second refrigerant pipe 4a to be condensed in the condenser 4. The refrigerant condensed in the condenser 4 is moved to the expansion valve 5 through the fourth refrigerant pipe 4b to be expanded in the expansion valve 5. The refrigerant expanded in the expansion valve 5 is moved to the evaporator 3 through the fifth refrigerant pipe 5a to cool air within the vehicle while being evaporated in the evaporator 3. The refrigerant evaporated in the evaporator 3 is moved into the motor unit 10 through the third refrigerant pipe 3b by a pumping force of the pump 8 to cool a heat of the motor unit 10, and the refrigerant moved into the motor unit 10 is again moved into the compression unit 20 to be compressed.

In contrast, when the first valve 6 is opened and the second valve 7 is closed, the refrigerant compressed in the compression unit 20 is moved to the evaporator 3 through the first refrigerant pipe 3a, and the refrigerant moved to the evaporator 3 is moved into the motor unit 10 through the third refrigerant pipe 3b by a pumping force of the pump 8, and the refrigerant moved into the motor unit 10 is moved again to the evaporator 3 through the first refrigerant pipe 3a to minimize generation of a back pressure in the compression unit 20.

The driving device 100 of the vehicle will be described with reference to FIGS. 2 to 5.

Figure 2:
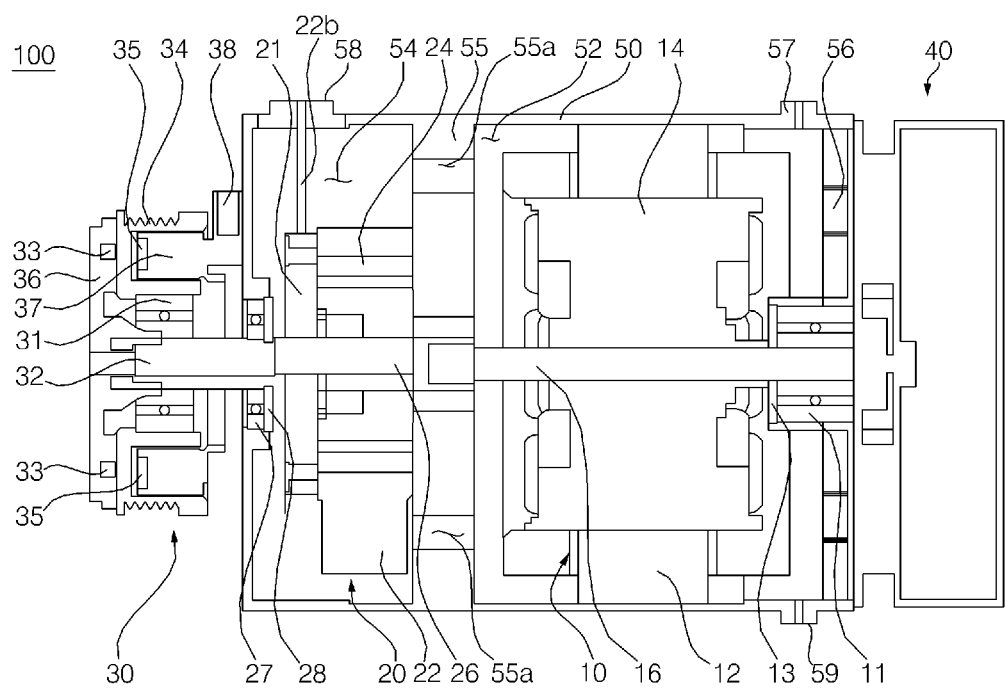
FIG. 2 is a transverse cross-sectional view illustrating a driving device of the vehicle of FIG. 1.
Figure 3:
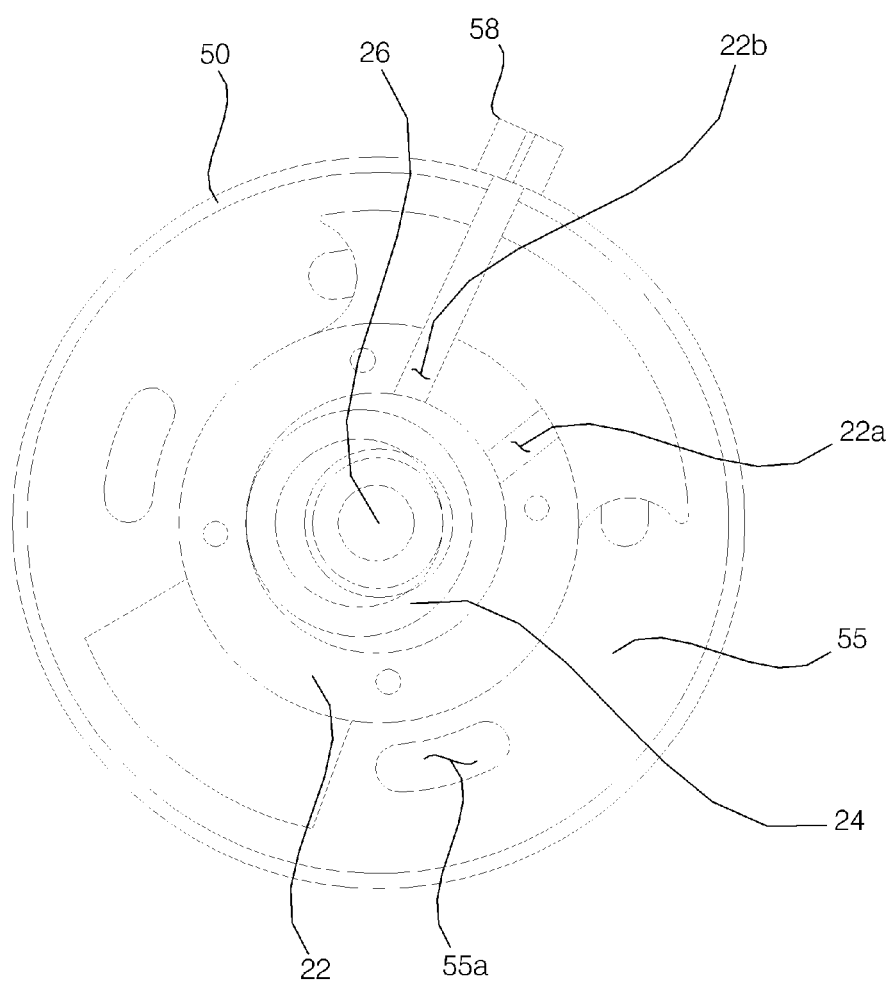
FIG. 3 is a longitudinal cross-sectional view illustrating a compression unit of FIG. 1.
Figure 4:
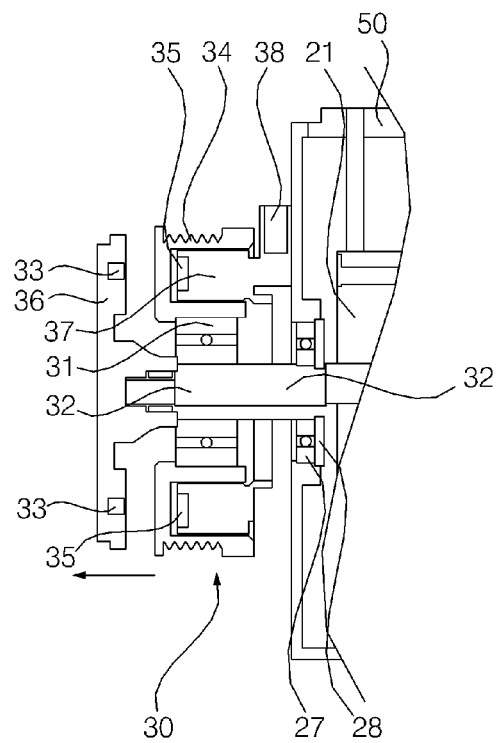
FIG. 4 is a partial cross-sectional view illustrating a state in which a clutch plate of a first clutch unit of FIG. 1 releases a connection of a clutch shaft and a clutch pulley.
Figure 5:
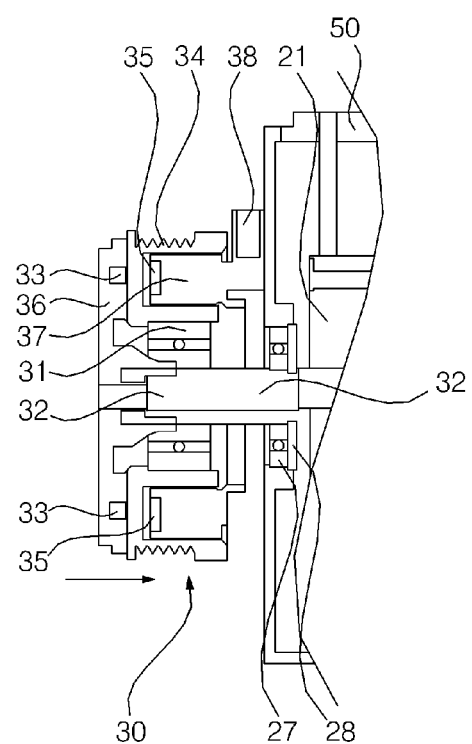
FIG. 5 is a partial cross-sectional view illustrating a state in which a clutch plate of a first clutch unit of FIG. 1 connects a clutch shaft and a clutch pulley.

FIG. 2 is a transverse cross-sectional view illustrating a driving device of the vehicle of FIG. 1, FIG. 3 is a longitudinal cross-sectional view illustrating a compression unit of FIG. 1, FIG. 4 is a partial cross-sectional view illustrating a state in which a clutch plate of a first clutch unit of FIG. 1 releases a connection of a clutch shaft and a clutch pulley, and FIG. 5 is a partial cross-sectional view illustrating a state in which a clutch plate of a first clutch unit of FIG. 1 connects a clutch shaft and a clutch pulley.

Referring to FIGS. 2 to 5, the motor unit 10 and the compression unit 20 are received within a housing 50. A motor unit receiving space (motor receiving space) 52 that houses the motor unit 10 and a compression unit receiving space (compressor receiving space) 54 that houses the compression unit 20 are formed in the housing 50. A separation wall 55 that partitions an internal space into the motor unit receiving space 52 and the compression unit receiving space 54 is formed in the housing 50.

An inverter cooling pin 56 that releases heat of the inverter 40 to a side surface toward the inverter 40 is formed in the housing 50.

The motor unit 10 includes a stator 12 fixed within the housing 50, a rotor 14 rotatably disposed within the stator 12, and a rotation shaft 16 that penetrates the rotor 14 and that is coupled to the rotor 14.

When a current is supplied from the inverter 40 to the stator 12, the rotor 14 rotates by an electric field formed between the stator 12 and the rotor 14. When the rotor 14 rotates, the rotation shaft 16 simultaneously rotates together with the rotor 14. One end of the rotation shaft 16 is rotatably coupled to the housing 50 and the other end thereof is coupled to a rotation shaft 26 of the compression unit 20. One end of the rotation shaft 16 may be rotatably coupled to the housing 50 through a bearing 11. A sealer 13 is disposed in the housing 50 at a periphery of the bearing 11 that seals a space between the housing 50 and the rotation shaft 16.

When the motor unit 10 rotates by a driving force of the engine 1, the motor unit 10 performs a function of a generator that generates a current to charge the battery 2.

The compression unit 20 is formed in a scroll type. That is, the compression unit 20 includes a fixed scroll 22 fixed within the housing 50, a revolving scroll 24 rotatably disposed within the fixed scroll 22, and a rotation shaft 26 that penetrates the revolving scroll 24 and coupled to the revolving scroll 24.

The rotation shaft 26 is coupled to the rotation shaft 16 of the motor unit 10, and when the rotation shaft 16 of the motor unit 10 rotates, the rotation shaft 26 rotates the revolving scroll 24 while simultaneously rotating together with the rotation shaft 16. The rotation shaft 16 of the motor unit 10 is inserted into the separation wall 55 to be coupled to the rotation shaft 26 of the compression unit 20. A bearing is installed in the separation wall 55 that rotatably couples the rotation shaft 16 of the motor unit 10 to the separation wall 55. Further, a sealer is disposed in the separation wall 55 that seals a space between the rotation shaft 16 of the motor unit 10 and the separation wall 55.

One end of the rotation shaft 26 of the compression unit 20 is coupled to the rotation shaft 16 of the motor unit 10, and the other end thereof is coupled to a clutch shaft 32, which is a rotation shaft of the first clutch unit 30. The rotation shaft 26 is eccentrically disposed relative to the rotation shaft 16 of the motor unit 10. Therefore, when the rotation shaft 16 of the motor unit 10 rotates, while the rotation shaft 26 rotates, an eccentric amount is changed and thus as a space volume between the fixed scroll 22 and the revolving scroll 24 changes, a refrigerant at a space between the fixed scroll 22 and the revolving scroll 24 is compressed.

One surface of the fixed scroll 22 toward the motor unit 10 is sealed by the separation wall 55, and the other surface thereof is sealed by a head 21. As the revolving scroll 24 is disposed within the fixed scroll 22 between the separation wall 55 and the head 21, when the revolving scroll 24 rotates, a refrigerant disposed at a space between the fixed scroll 22 and the revolving scroll 24 may be compressed.

The rotation shaft 26 of the compression unit 20 is protruded by penetrating the head 21, and a protruded portion of the rotation shaft 26 may be coupled to the clutch shaft 32.

An injection hole 22a is formed in the fixed scroll 22 to inject a refrigerant to a space between the fixed scroll 22 and the revolving scroll 24. A discharge hole 22b is formed in the fixed scroll 22 to discharge a refrigerant compressed at a space between the fixed scroll 22 and the revolving scroll 24. That is, a refrigerant existing at the compression unit receiving space 54 is injected into a space between the fixed scroll 22 and the revolving scroll 24 through the injection hole 22a to be compressed, and the refrigerant compressed at a space between the fixed scroll 22 and the revolving scroll 24 is discharged through the discharge hole 22b.

A first refrigerant injection port (first refrigerant inlet port) 57 is formed in the housing 50 that injects a refrigerant into the motor unit receiving space 52. In the present exemplary embodiment, the first refrigerant injection port 57 is connected to the evaporator 3 through the third refrigerant pipe 3b. Further, in the housing 50, a first refrigerant discharge port 59 that discharges a refrigerant from the motor unit receiving space 52 is formed. In the present exemplary embodiment, the first refrigerant discharge port 59 is connected to the evaporator 3 through the first refrigerant pipe 3a.

Further, a second refrigerant discharge port 58 is formed in the housing 50 that communicates with the discharge hole 22b. That is, a refrigerant discharged to the compression unit receiving space 54 through the discharge hole 22b may be discharged from the compression unit receiving space 54 to the outside of the housing 50 through the second refrigerant discharge port 58. In the present exemplary embodiment, the second refrigerant discharge port 58 is connected to the condenser 4 through the second refrigerant pipe 4a.

When the first valve 6 is closed and the second valve 7 is opened, a refrigerant compressed in the compression unit 20 sequentially passes through the second refrigerant pipe 4a, the condenser 4, the fourth refrigerant pipe 4b, the expansion valve 5, the fifth refrigerant pipe 5a, the evaporator 3, and the third refrigerant pipe 3b and is moved to the motor unit receiving space 52 to cool a heat of the motor unit 10, and the refrigerant moved to the motor unit receiving space 52 is again moved to the compression unit receiving space 54 to be compressed within the compression unit 20. In order to move the refrigerant moved to the motor unit receiving space 52 to the compression unit receiving space 54, a second refrigerant injection port (second refrigerant inlet port) 55a is formed in the separation wall 55.

Further, as described above, when the first valve 6 is closed and the second valve 7 is opened, the refrigerant moved to the evaporator 3 exchanges heat with air within the vehicle to cool air within the vehicle.

When the first valve 6 is opened and the second valve 7 is closed, a refrigerant compressed in the compression unit 20 sequentially passes through the first refrigerant pipe 3a, the evaporator 3, and the third refrigerant pipe 3b, is moved to the motor unit receiving space 52, and is again moved to the evaporator 3 through the first refrigerant pipe 3a, thereby minimizing generation of a back pressure in the compression unit 20.

The first clutch unit 30 includes a clutch shaft 32 coupled to the rotation shaft 26 of the compression unit 20 to be protruded to the outside of the housing 50, a clutch pulley 34 rotatably coupled to the clutch shaft 32, and a clutch plate 36 provided in the clutch shaft 32 to connect or release the clutch shaft 32 and the clutch pulley 34.

One end of the clutch shaft 32 is inserted into the housing 50 to be coupled to the rotation shaft 26 of the compression unit 20. The clutch shaft 32 is rotatably coupled to the housing 50. The clutch shaft 32 may be rotatably coupled to the housing 50 through a bearing 27. A sealer 28 is disposed in the housing 50 at a periphery of the bearing 27 that seals a space between the clutch shaft 32 and the housing 50.

The clutch shaft 32, the rotation shaft 26 of the compression unit 20, and the rotation shaft 16 of the motor unit 10 are together simultaneously rotated. That is, when the rotation shaft 16 of the motor unit 10 rotates, the rotation shaft 26 of the compression unit 20 rotates by torque of the rotation shaft 16, and the clutch shaft 32 rotates by torque of the rotation shaft 26. Further, when the clutch shaft 32 rotates, the rotation shaft 26 of the compression unit 20 rotates by torque of the clutch shaft 32, and the rotation shaft 16 of the motor unit 10 rotates by torque of the rotation shaft 26.

The clutch pulley 34 may be rotatably coupled to the clutch shaft 32 through a bearing 31. The clutch pulley 34 is connected to a flywheel of the engine 1 through a belt.

The clutch plate 36 is disposed at an end portion of the clutch shaft 32. The clutch plate 36 is coupled to the clutch shaft 32 to slide in an axial direction and is disposed to simultaneously rotate together with the clutch shaft 32. When the clutch plate 36 is moved in one axial direction of the clutch shaft 32, the clutch plate 36 engages with the clutch pulley 34 to connect the clutch shaft 32 and the clutch pulley 34. Further, if the clutch plate 36 moves in a direction opposite to that when connecting the clutch shaft 32 and the clutch pulley 34, the clutch plate 36 may release a connection between the clutch shaft 32 and the clutch pulley 34.

In a state in which the clutch plate 36 connects the clutch shaft 32 and the clutch pulley 34, as the motor unit 10 is driven, when the rotation shaft 16 of the motor unit 10 rotates, the rotation shaft 26 of the compression unit 20, the clutch shaft 32, and the clutch pulley 34 simultaneously rotate together with the rotation shaft 16 of the motor unit 10. Therefore, because the flywheel of the engine 1 connected to the clutch pulley 34 through a belt rotates, a driving force of the motor unit 10 may be transferred to the engine.

Further, in a state in which the clutch plate 36 connects the clutch shaft 32 and the clutch pulley 34, as the engine 1 is operated, when the flywheel rotates, the clutch pulley 34 connected to the flywheel through the belt rotates. Therefore, because the clutch shaft 32, the rotation shaft 26 of the compression unit 20, and the rotation shaft 16 of the motor unit 10 rotate, a driving force of the engine 1 may be transferred to the motor unit 10.

In order to enable the clutch plate 36 to connect or release the clutch shaft 32 and the clutch pulley 34, a first magnet 33 is disposed at the clutch plate 36, and a second magnet 35 is disposed in the clutch pulley 34 at a location corresponding to that of the first magnet 33. The first magnet 33 is formed with a permanent magnet, and the second magnet 35 is formed with an electromagnet. Because the first magnet 33 and the second magnet 35 have a configuration that enables the clutch pulley 34 to be fixed to the clutch shaft 32 by a frictional force with the clutch plate 36 by closely contacting the clutch plate 36 with the clutch pulley 34 or that rotates the clutch pulley 34 relative to the clutch shaft 32 by separating the clutch plate 36 from the clutch pulley 34, the first magnet 33 may be formed with an electromagnet and the second magnet 35 may be formed with a permanent magnet.

In the present exemplary embodiment, the second magnet 35 is formed with an electromagnet to be disposed within the clutch pulley 34. Further, in the clutch pulley 34, an electromagnet coil 37 is further disposed. The electromagnet coil 37 receives application of a current through a connector 38 to enable the second magnet 35 to generate an electromagnetic force. The second magnet 35 pulls the first magnet 33 disposed at the clutch plate 36 using the electromagnetic force to enable the clutch plate 36 to engage with the clutch pulley 34 by closely contacting with the clutch pulley 34 or pushes the first magnet 33 disposed at the clutch plate 36 using the electromagnetic force to enable the clutch plate 36 to be separated from the clutch pulley 34.

Figure 6:
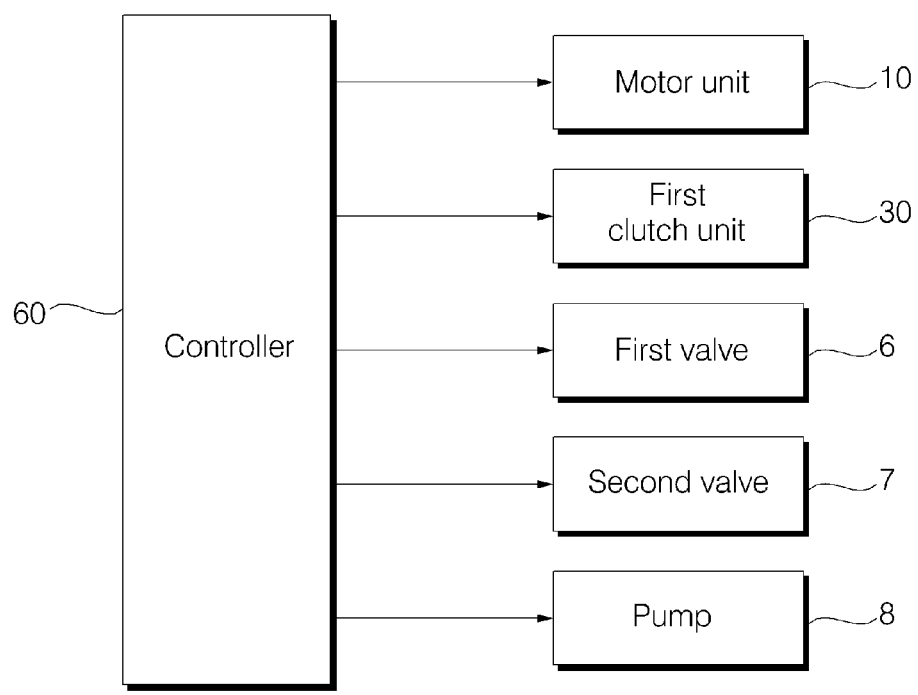
FIG. 6 is a block diagram illustrating the control of a vehicle according to a first exemplary embodiment of the present invention.

FIG. 6 is a block diagram illustrating the control of a vehicle according to a first exemplary embodiment of the present invention.

Referring to FIG. 6, a vehicle according to an exemplary embodiment of the present invention further includes a controller 60 that controls the motor unit 10, the first clutch unit 30, the first valve 6, the second valve 7, and the pump 8.

The controller 60 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The controller 60 may be separately provided from the inverter 40 that controls the motor unit 10 to control the inverter 40 or to have a function of the inverter 40. When the controller 60 has a function of the inverter 40, the inverter 40 for controlling the motor unit 10 may not be installed in the housing 50. Hereinafter, for a better understanding of a description, it is regarded that the controller 60 has a function of the inverter 40.

By applying or blocking a current to the electromagnet coil 37, the controller 60 may control the first clutch unit 30. That is, when the controller 60 applies a current to the electromagnet coil 37, the second magnet 35 pulls the first magnet 33 disposed at the clutch plate 36 by generating an electromagnetic force and thus the clutch plate 36 may closely contact the clutch pulley 34. When the controller 60 blocks application of a current to the electromagnet coil 37, an electromagnetic force disappears in the second magnet 35 and thus the clutch plate 36 may be separated from the clutch pulley 34 while moving to an original location by an elastic force of a spring installed in the clutch shaft 32.

The first valve 6 and the second valve 7 are formed with a solenoid valve that may be controlled by the controller 60.

Operation of a vehicle according to an exemplary embodiment of the present invention having the above-described configuration will be described.

Figure 7:
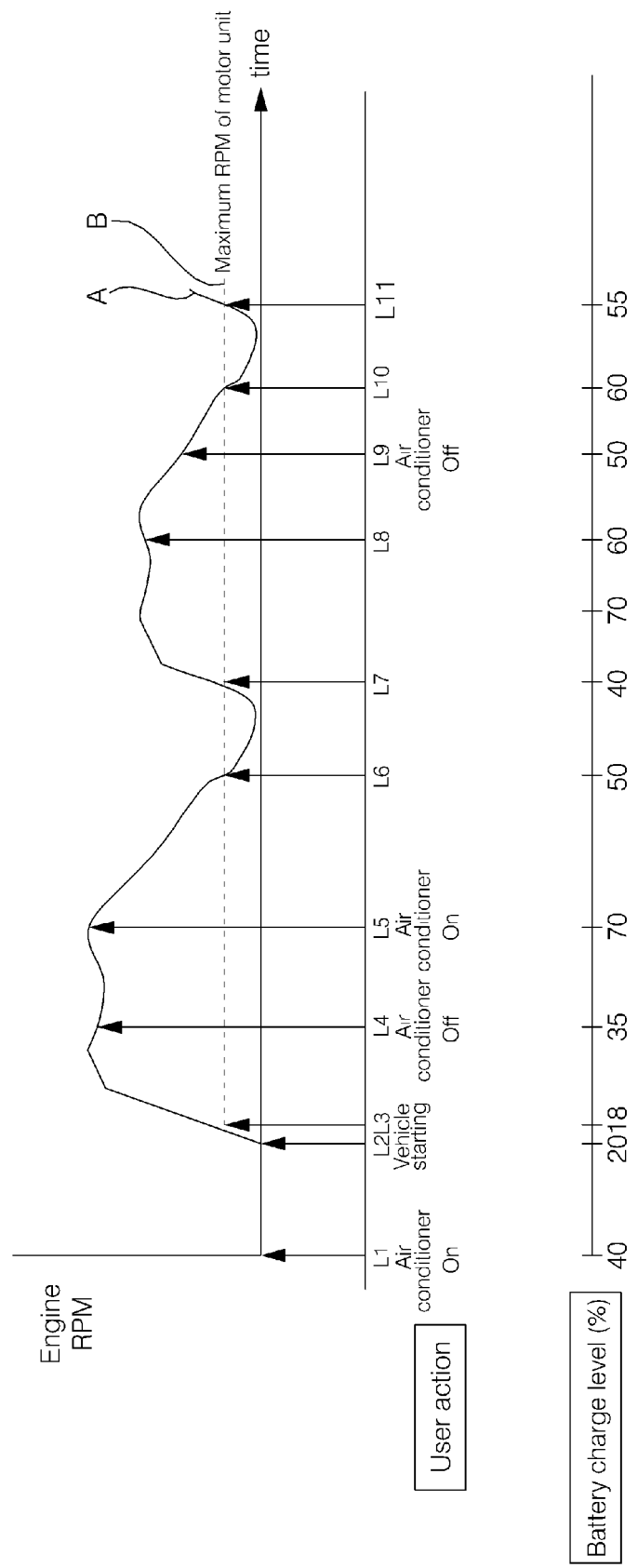
FIG. 7 is a diagram illustrating an operation mode of a vehicle according to a first exemplary embodiment of the present invention.

FIG. 7 is a diagram illustrating an operation mode of a vehicle according to a first exemplary embodiment of the present invention. In FIG. 7, A is a graph representing present revolutions per minute (RPM) of the engine 1 according to a time, and B is a graph representing maximum revolutions per minute (RPM) of the motor unit 10. Here, present RPM of the engine 1 may be the present RPM of the flywheel. Maximum RPM of the motor unit 10 may be the maximum RPM of the rotation shaft 16. Maximum RPM of the motor unit 10 is RPM in which the motor unit 10 is driven by a current supplied from the battery 2, and when the motor unit 10 is driven by a current supplied from the battery 2, the motor unit 10 is constantly driven with maximum RPM.

Referring to FIG. 7, a vehicle according to a first exemplary embodiment of the present invention operates in six modes. FIG. 7 sequentially illustrates six modes according to a present RPM of the engine 1, a maximum RPM of the motor unit 10, a user action, and a charge amount of a battery while a driver rides and drives the vehicle in a state in which an engine of the vehicle is stopped. A case in which an initial charge amount of the battery 2 is 40% is illustrated.

A first mode is a mode that cools air within the vehicle when the engine 1 is in a stop state and corresponds to a segment L1-L2 in FIG. 7.

That is, in the first mode, when the engine 1 is in a stop state, if the user rides at the vehicle and turns on an air conditioner button, an air conditioner ON signal is transmitted to the controller 60.

When the engine 1 is in a stop state, if the air conditioner ON signal is input, the controller 60 controls the first clutch unit 30 not to transfer a driving force of the motor unit 10 to the engine 1 and controls the motor unit 10 to be driven by a current supplied from the battery 2.

Here, that the first clutch unit 30 does not transfer a driving force of the motor unit 10 to the engine 1 means that the clutch plate 36 releases a connection of the clutch shaft 32 and the clutch pulley 34.

Thereby, the compression unit 20 is driven by a driving force of the motor unit 10 to rotate the clutch shaft 32 while compressing a refrigerant. However, because the clutch plate 36 disconnects a connection between the clutch shaft 32 and the clutch pulley 34, even if the clutch shaft 32 rotates, the clutch pulley 34 does not rotate. Therefore, a driving force of the motor unit 10 is not transferred to a flywheel of the engine 1.

The controller 60 closes the first valve 6 and opens the second valve 7.

Thereby, a refrigerant compressed in the compression unit 20 is moved to the condenser 4 through the second refrigerant pipe 4a to be condensed, the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange a heat with air within the vehicle, thereby cooling air within the vehicle.

The controller 60 drives the pump 8. Therefore, the refrigerant evaporated by heat exchange in the evaporator 3 is moved to the motor unit receiving space 52 through the third refrigerant pipe 3b to cool a heat of the motor unit 10 and is moved to the compression unit receiving space 54 to be again compressed within the compression unit 20.

Because the motor unit 10 consumed a current supplied from the battery 2 to be driven, it can be seen that a charge amount of the battery 2 was consumed from 40% of L1 to 20% of L2.

When a charge amount of the battery 2 is a reference value or less, the controller 60 controls the motor unit 10 to be driven by a driving force of the engine 1 to generate a current and controls the battery 2 to be charged by the current generated by the motor unit 10. Further, when a charge amount of the battery 2 is a reference value or more, the controller 60 controls the motor unit 10 to be driven by a current supplied by the battery 2 instead of a driving force of the engine 1, thereby improving fuel consumption.

By checking a voltage of the battery 2, the controller 60 may know a charge amount of the battery 2. That is, when a charge amount of the battery 2 is a first setting value or less, the controller 60 controls the motor unit 10 to be driven by a driving force of the engine 1 to generate a current and controls to charge the battery 2 by a current generated by the motor unit 10. Further, when a voltage value of the battery 2 is a second setting value or more larger than the first setting value, the controller 60 controls the motor unit 10 to be driven by a current supplied by the battery 2 instead of a driving force of the engine 1. In the present exemplary embodiment, the first setting value is set to the controller 60 with a voltage value when a charge amount of the battery 2 is 50%, and the second setting value is set to the controller 60 with a voltage value when a charge amount of the battery 2 is 70%.

In order words, when a charge amount of the battery 2 is 50% or less, the controller 60 controls the motor unit 10 to be driven by a driving force of the engine 1 to generate a current and controls the current generated by the motor unit 10 to be charged in the battery 2. When a charge amount of the battery 2 is 70% or more, the controller 60 controls the motor unit 10 to be driven by a current supplied from the battery 2 to drive the compression unit 20.

However, in the first mode, because a charge amount of the battery 2 is 40%-20%, which is smaller than the 50%, the controller 60 should control the battery 2 to be charged. However, because the engine 1 is in a stopped state, a driving force of the engine 1 cannot be transferred to the motor unit 10 and thus in the first mode, the controller 60 cannot control the battery 2 to be charged.

That is, in order to drive the motor unit 10 by a driving force of the engine 1, in a state in which the present RPM of the engine 1 is larger than the maximum RPM of the motor unit 10, the engine 1 should be operated. Therefore, in a state in which the present RPM of the engine 1 is larger than the maximum RPM of the motor unit 10, when the engine 1 is operated, the controller 60 controls the first clutch unit 30 to transfer a driving force of the engine 1 to the motor unit 10 and thus the motor unit 10 is driven by a driving force of the engine 1 to generate a current.

Therefore, in a state in which the present RPM of the engine 1 is larger than the maximum RPM of the motor unit 10, when the engine 1 is operated and when a charge amount of the battery 2 is 50% or less, which is the first setting value, the controller 60 controls the first clutch unit 30 to transfer a driving force of the engine 1 to the motor unit 10 and thus the motor unit 10 is driven by a driving force of the engine 1 to generate a current and enables a current generated by the motor unit 10 to be charged in the battery 2. An operation mode related to a charge amount of the battery 2 will be described later in a fourth mode to a sixth mode.

A second mode is a mode that starts the engine 1 when the engine 1 is in a stop state and corresponds to L2 in FIG. 7. Here, L2 represents a state in which the air conditioner button is still on.

That is, in the second mode, when the engine 1 is in a stop state, if the driver presses an engine start button or manipulates an engine start key, an engine starting signal is transmitted to the controller 60.

When the engine starting signal is input, the controller 60 controls the first clutch unit 30 to transfer a driving force of the motor unit 10 to the engine 1 and controls the motor unit 10 to be driven by a current supplied from the battery 2.

Here, that the first clutch unit 30 transfers a driving force of the motor unit 10 to the engine 1 means that the clutch plate 36 connects the clutch shaft 32 and the clutch pulley 34.

Thereby, the compression unit 20 is driven by a driving force of the motor unit 10 to rotate the clutch shaft 32 while compressing a refrigerant. Because the clutch plate 36 connects the clutch shaft 32 and the clutch pulley 34, when the clutch shaft 32 rotates, the clutch pulley 34 also rotates. Therefore, a driving force of the motor unit 10 is transferred to a flywheel of the engine 1 to start the engine 1.

In a state in which the air conditioner button is turned on, as in L2, the air conditioner ON signal is input to the controller 60. Even if the air conditioner ON signal is in an input state, when the engine starting signal is input, the controller 60 opens the first valve 6 and closes the second valve 7.

Thereby, a refrigerant compressed in the compression unit 20 is moved to the evaporator 3 through the first refrigerant pipe 3*a* but is not moved to the condenser 4. Therefore, air within the vehicle is not cooled.

The controller 60 drives the pump 8. Therefore, after the refrigerant moved to the evaporator 3 is moved to the motor unit receiving space 52 through the third refrigerant pipe 3*b*, the refrigerant is again moved to the evaporator 3 through the first refrigerant pipe 3*a* to enable a back pressure not to generate in the compression unit 20.

A third mode is a mode that assists the engine 1 in a state in which the present RPM of the engine 1 is smaller than the maximum RPM of the motor unit 10 and corresponds to a segment L2-L3, a segment L6-L7, and a segment L10-L11 in FIG. 7. Here, the segment L2-L3 represents a state after the engine 1 is started, and the segment L6-L7 and the segment L10-L11 represent a state in which the present RPM of the engine 1 is smaller than the maximum RPM of the motor unit 10, as a user steps on a brake while the vehicle drives. The segment L2-L3 and the segment L6-L7 represent a state in which the air conditioner button is turned on by the user, and the segment L10-L11 represents a state in which the air conditioner button is turned off by the user.

That is, in the third mode, in a state in which the present RPM of the engine 1 is smaller than the maximum RPM of the motor unit 10, when the engine 1 is operated, the controller 60 controls the first clutch unit 30 to transfer a driving force of the motor unit 10 to the engine 1 and controls the motor unit 10 to be driven by a current supplied from the battery 2.

Here, that the first clutch unit 30 transfers a driving force of the motor unit 10 to the engine 1 means that the clutch plate 36 connects the clutch shaft 32 and the clutch pulley 34.

Thereby, the compression unit 20 is driven by a driving force of the motor unit 10 to rotate the clutch shaft 32 while compressing a refrigerant. Because the clutch plate 36 connects the clutch shaft 32 and the clutch pulley 34, when the clutch shaft 32 rotates, the clutch pulley 34 also rotates. Therefore, a driving force of the motor unit 10 is transferred to a flywheel of the engine 1 to enable the engine 1 to be driven with an RPM larger than the maximum RPM of the motor unit 10.

At the segment L2-L3, the segment L6-L7, and the segment L10-L11, because the motor unit 10 is driven by a current supplied from the battery 2 to consume a current of the battery 2, it can be seen that a charge amount of the battery 2, having been 20% at L2 becomes 18% at L3. It can be seen that a charge amount of the battery 2, having been 50% at L6 becomes 40% at L7. It can be seen that a charge amount of the battery 2, having been 60% at L10 becomes 55% at L11.

When the air conditioner button is in a turned on state, as in the segment L2-L3 and the segment L6-L7, the air conditioner ON signal is input to the controller 60. Therefore, when the air conditioner ON signal is input, the controller 60 closes the first valve 6 and opens the second valve 7.

Thereby, a refrigerant compressed in the compression unit 20 is moved to the condenser 4 through the second refrigerant pipe 4a to be condensed, the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange heat with air within the vehicle, thereby cooling air within the vehicle.

The controller 60 drives the pump 8. Therefore, after the refrigerant evaporated by heat exchange in the evaporator 3 is moved to the motor unit receiving space 52 through the third refrigerant pipe 3b to cool the motor unit 10, the refrigerant is moved to the compression unit receiving space 54 to be again compressed within the compression unit 20.

Further, when the air conditioner button is in a turned off state, as in the segment L10-L11, the air conditioner OFF signal is input to the controller 60. Therefore, when the air conditioner OFF signal is input, the controller 60 opens the first valve 6 and closes the second valve 7.

Thereby, a refrigerant compressed in the compression unit 20 is moved to the evaporator 3 through the first refrigerant pipe 3a but is not moved to the condenser 4. Therefore, air within the vehicle is not cooled.

The controller 60 drives the pump 8. Therefore, after a refrigerant moved to the evaporator 3 is moved to the motor unit receiving space 52 through the third refrigerant pipe 3b, the refrigerant is again moved to the evaporator 3 through the first refrigerant pipe 3a to enable a back pressure not to generate in the compression unit 20.

A fourth mode is a mode that charges the battery 2, if a charge amount of the battery 2 is a reference voltage (here, the first setting value) or less, when the engine 1 is operating in a state in which the present RPM of the engine 1 is larger than the maximum RPM of the motor unit 10 and corresponds to a segment L3-L4, a segment L4-L5, and a segment L9-L10 in FIG. 7. Here, the segment L3-L4 represents a state in which the air conditioner button is turned on by a user, and the segment L4-L5 and the segment L9-L10 represent a state in which the air conditioner button is turned off by the user.

Therefore, in the fourth mode, in a state in which the present RPM of the engine 1 is larger than the maximum RPM of the motor unit 10, when the engine 1 is operated and when a charge amount of the battery 2 is the first setting value (50%) or less, the controller 60 controls the first clutch unit 30 to transfer a driving force of the engine 1 to the motor unit 10 and controls the motor unit 10 to generate a current by a driving force of the engine 1 and controls the current to charge the battery 2.

Here, that the first clutch unit 30 transfers a driving force of the engine 1 to the motor unit 10 means that the clutch plate 36 connects the clutch shaft 32 and the clutch pulley 34.

Thereby, the clutch shaft 32 is rotated by a driving force of the engine 1 to rotate the rotation shaft 26 of the compression unit 20. When the rotation shaft 26 of the compression unit 20 rotates, the compression unit 20 is driven by a driving force of the engine 1 to rotate the rotation shaft 16 of the motor unit 10 while compressing a refrigerant. Therefore, the motor unit 10 is driven by a driving force of the engine 1 to generate a current, thereby charging the battery 2.

At the segment L3-L4, the segment L4-L5, and the segment L9-L10, because the motor unit 10 is driven by a driving force of the engine 1 to charge the battery 2, it can be seen that a charge amount of the battery 2, having been 18% at L3 becomes 35% at L4 and 70% at L5. It can be seen that a charge amount of the battery 2, having been 50% at L9 becomes 60% at L10.

In a state in which the air conditioner button is turned on, as in the segment L3-L4, the air conditioner ON signal is input to the controller 60. Therefore, when the air conditioner ON signal is input, the controller 60 closes the first valve 6 and opens the second valve 7.

Thereby, a refrigerant compressed in the compression unit 20 is moved to the condenser 4 through the second refrigerant pipe 4a to be condensed, and the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange a heat with air within the vehicle, thereby cooling air within the vehicle.

The controller 60 drives the pump 8. Therefore, the refrigerant evaporated by heat exchange in the evaporator 3 is moved to the motor unit receiving space 52 through the third refrigerant pipe 3b to cool the motor unit 10 and is moved to the compression unit receiving space 54 to be again compressed within the compression unit 20.

In a state in which the air conditioner button is turned off, as in the segment L4-L5 and the segment L9-L10, the air conditioner OFF signal is input to the controller 60. When the air conditioner OFF signal is input to the controller 60, the controller 60 opens the first valve 6 and closes the second valve 7.

Thereby, a refrigerant compressed in the compression unit 20 is moved to the evaporator 3 through the first refrigerant pipe 3a but is not moved to the condenser 4. Therefore, air within the vehicle is not cooled.

The controller 60 drives the pump 8. Therefore, after a refrigerant moved to the evaporator 3 is moved to the motor unit receiving space 52 through the third refrigerant pipe 3b, the refrigerant is again moved to the evaporator 3 through the first refrigerant pipe 3a to enable a back pressure not to generate in the compression unit 20.

A fifth mode is a mode in which the motor unit 10 is driven by a current supplied from the battery 2 to drive the compression unit 20 and corresponds to a segment L5-L6 in FIG. 7, if a user turns on the air conditioner button, when a charge amount of the battery 2 is a reference voltage (here, the second setting value) or more and when the engine 1 is operated, in a state in which the present RPM of the engine 1 is larger than the maximum RPM of the motor unit 10.

That is, in the fifth mode, in a state in which the present RPM of the engine 1 is larger than the maximum RPM of the motor unit 10, when the engine 1 is operated and when a charge amount of the battery 2 is the second setting value (70%) or more, if the user turns on the air conditioner button, the controller 60 controls the first clutch unit 30 not to transfer a driving force of the motor unit 10 to the engine 1, controls the motor unit 10 to be driven by a current supplied from the battery 2, and closes the first valve 6 and opens the second valve 7.

Here, that the first clutch unit 30 does not transfer a driving force of the motor unit 10 to the engine 1 means that the clutch plate 36 releases a connection of the clutch shaft 32 and the clutch pulley 34, and when the user turns on the air conditioner button, the air conditioner ON signal is input to the controller 60.

Thereby, the compression unit 20 is driven by a driving force of the motor unit 10 to rotate the clutch shaft 32 while compressing a refrigerant. However, because the clutch plate 36 disconnects a connection between the clutch shaft 32 and the clutch pulley 34, even if the clutch shaft 32 rotates, the clutch pulley 34 does not rotate. Therefore, a driving force of the motor unit 10 is not transferred to a flywheel of the engine 1.

At the segment L5-L6, the motor unit 10 is driven by a current supplied from the battery 2 and thus because a current of the battery 2 is consumed, it can be seen that a charge amount of the battery 2, having been 70% at L5 becomes 50% at L6.

Because the controller 60 closes the first valve 6 and opens the second valve 7, a refrigerant compressed in the compression unit 20 is moved to the condenser 4 through the second refrigerant pipe 4a to be condensed, and the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange a heat with air within the vehicle, thereby cooling air within the vehicle.

The controller 60 drives the pump 8. Therefore, the refrigerant evaporated by heat exchange in the evaporator 3 is moved to the motor unit receiving space 52 through the third refrigerant pipe 3b to cool the motor unit 10 and is moved to the compression unit receiving space 54 to be again compressed within the compression unit 20.

A sixth mode is a mode that converts from the fourth mode to the fifth mode according to a charge amount of the battery 2, when the engine 1 is operating in a state in which the present RPM of the engine 1 is larger than the maximum RPM of the motor unit 10 and corresponds to a segment L7-L8 and a segment L8-L9 in FIG. 7. Here, the segment L7-L8 and the segment L8-L9 represent a state in which the air conditioner button is turned on by a user.

That is, in the sixth mode, in a state in which the present RPM of the engine 1 is larger than the maximum RPM of the motor unit 10, when the engine 1 is operated and when a charge amount of the battery 2 is the first setting value (50%) or less, if the user turns on the air conditioner button, the controller 60 controls the first clutch unit 30 to transfer a driving force of the engine 1 to the motor unit 10 and controls the motor unit 10 to generate a current by a driving force of the engine 1 to charge the battery 2, and closes the first valve 6 and opens the second valve 7.

Here, that the first clutch unit 30 transfers a driving force of the engine 1 to the motor unit 10 means that the clutch plate 36 connects the clutch shaft 32 and the clutch pulley 34, and when the user turns on the air conditioner button, the air conditioner ON signal is input to the controller 60.

Thereby, the clutch shaft 32 is rotated by a driving force of the engine 1 to rotate the rotation shaft 26 of the compression unit 20. When the clutch shaft 32 rotates, the rotation shaft 26 of the compression unit 20 rotates together with the clutch shaft 32 and thus the compression unit 20 is driven by a driving force of the engine 1 to rotate the rotation shaft 16 of the motor unit 10 while compressing a refrigerant. Therefore, the motor unit 10 is driven by a driving force of the engine 1 to generate a current, thereby charging the battery 2.

At L7, because the motor unit 10 is driven by a driving force of the engine 1 to charge the battery 2, it can be seen that a charge amount of the battery 2, having been 40% at L7 becomes 70%, which is the second setting value before L8.

Because the controller 60 closes the first valve 6 and opens the second valve 7, a refrigerant compressed in the compression unit 20 is moved to the condenser 4 through the second refrigerant pipe 4a to be condensed, the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange heat with air within the vehicle, thereby cooling air within the vehicle.

The controller 60 drives the pump 8. Therefore, the refrigerant evaporated by heat exchange in the evaporator 3 is moved to the motor unit receiving space 52 through the third refrigerant pipe 3b to cool the motor unit 10 and is moved to the compression unit receiving space 54 to be again compressed within the compression unit 20.

When a charge amount of the battery 2 is the first setting value (50%) or less, the controller 60 starts to charge the battery 2, and when a charge amount of the battery 2 arrives at the second setting value (70%) larger than the first setting value, the controller 60 controls the first clutch unit 30 not to transfer a driving force of the motor unit 10 to the engine 1 and controls the motor unit 10 to be driven by a current supplied from the battery 2.

Here, that the first clutch unit 30 does not transfer a driving force of the motor unit 10 to the engine 1 means that the clutch plate 36 releases a connection of the clutch shaft 32 and the clutch pulley 34.

Thereby, the compression unit 20 is driven by a driving force of the motor unit 10 to rotate the clutch shaft 32 while compressing a refrigerant. However, because the clutch plate 36 disconnects a connection between the clutch shaft 32 and the clutch pulley 34, even if the clutch shaft 32 rotates, the clutch pulley 34 does not rotate. Therefore, a driving force of the motor unit 10 is not transferred to a flywheel of the engine 1.

When a charge amount of the battery 2 arrives at 70%, which is the second setting value, the motor unit 10 is driven by a current supplied from the battery 2 to consume a current of the battery 2 and thus it can be seen that a charge amount of the battery 2, having been 70%, which is the second setting value before L8 becomes 60% at L8 and becomes 50%, which is the first setting value at L9.

Because the controller 60 closes the first valve 6 and opens the second valve 7, a refrigerant compressed in the compression unit 20 is moved to the condenser 4 through the second refrigerant pipe 4a to be condensed, and the refrigerant condensed in the condenser 4 is moved to the expansion valve 5 through the fourth refrigerant pipe 4b to be expanded, and the refrigerant expanded in the expansion valve 5 is moved to the evaporator 3 through the fifth refrigerant pipe 5a to exchange heat with air within the vehicle, thereby cooling air within the vehicle.

The controller 60 drives the pump 8. Therefore, the refrigerant evaporated by heat exchange in the evaporator 3 is moved to the motor unit receiving space 52 through the third refrigerant pipe 3b to cool the motor unit 10 and is moved to the compression unit receiving space 54 to be again compressed within the compression unit 20.

Figure 8:
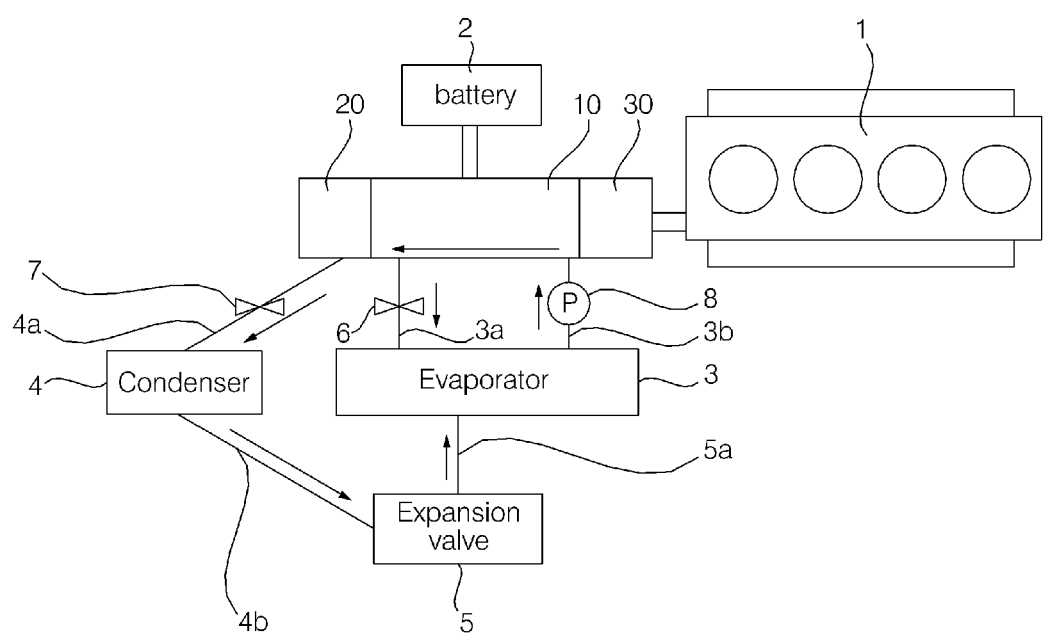
FIG. 8 is a block diagram illustrating a vehicle according to a second exemplary embodiment of the present invention.

FIG. 8 is a block diagram illustrating a vehicle according to a second exemplary embodiment of the present invention. Here, constituent elements identical to or corresponding to those of the first exemplary embodiment are denoted by the same reference numerals and therefore a detailed description thereof is omitted, and only dissimilar constituent elements are described here in detail.

Referring to FIG. 8, it can be seen that a vehicle according to a second exemplary embodiment of the present invention is different from the first exemplary embodiment of FIG. 1. That is, in the foregoing first exemplary embodiment, the first clutch unit 30 is disposed at one side of the compression unit 20, but in the second exemplary embodiment, the first clutch unit 30 is disposed at one side of the motor unit 10.

That is, the clutch shaft 32, which is a rotation shaft of the first clutch unit 30, is coupled to the rotation shaft 26 of the compression unit 20 in the first exemplary embodiment, but in the second exemplary embodiment, the clutch shaft 32 is coupled to the rotation shaft 16 of the motor unit 10. In the second exemplary embodiment, the compression unit 20 is formed in a rotary type in which a rotation shaft does not exist, and therefore the clutch shaft 32 is coupled to the rotation shaft 16 of the motor unit 10. Because a piston reciprocates within a cylinder by torque of the rotation shaft 16 of the motor unit 10, the rotary type compression unit 20 compresses a refrigerant within the cylinder. Therefore, in the rotary type compression unit 20, a rotation shaft does not exist.

That is, when the compression unit 20 is formed in a scroll type, as in the first exemplary embodiment, the clutch shaft 32 may be coupled to the rotation shaft 26 of the compression unit 20, and when the compression unit 20 is formed in a rotary type, as in the second exemplary embodiment, the clutch shaft 32 may be coupled to the rotation shaft 16 of the motor unit 10. When the compression unit 20 is formed in a scroll type, as in the first exemplary embodiment, the clutch shaft 32 may be coupled to the rotation shaft 16 of the motor unit 10.

As described above, in a vehicle according to a first exemplary embodiment and second exemplary embodiment of the present invention, the motor unit 10, the compression unit 20, and the first clutch unit 30 are integrally formed.

Therefore, a vehicle according to an exemplary embodiment of the present invention can improve fuel consumption by assisting the engine 1, and even when the engine 1 stops, the motor unit 10 can cool air within the vehicle by driving the compression unit 20, and a refrigerant can cool the motor unit 10 while passing through the motor unit receiving space 52.

Figure 9:
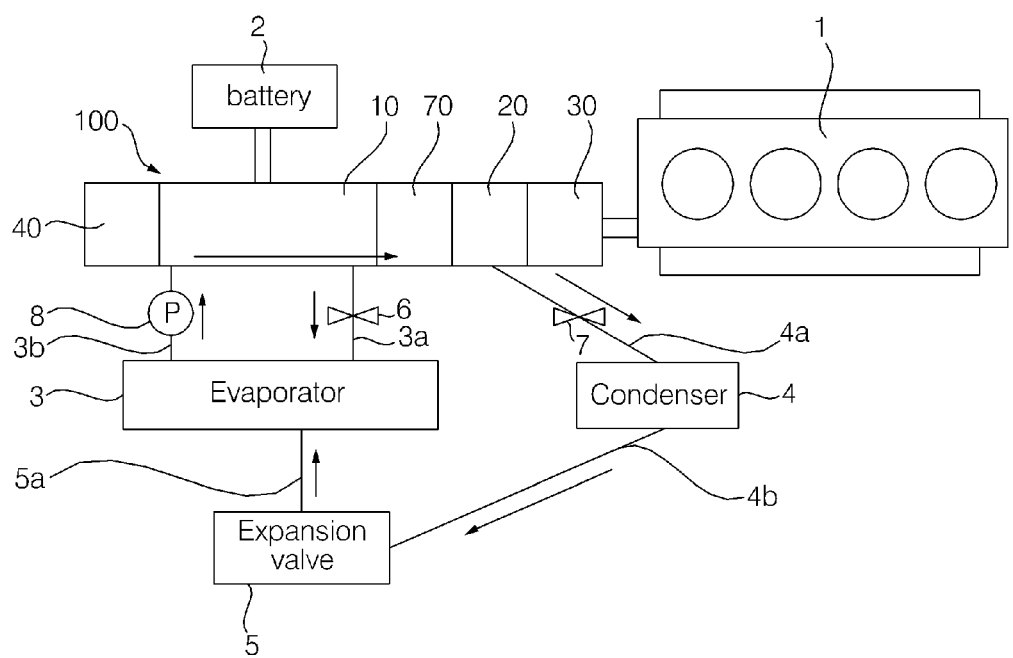
FIG. 9 is a block diagram illustrating a vehicle according to a third exemplary embodiment of the present invention.

FIG. 9 is a block diagram illustrating a vehicle according to a third exemplary embodiment of the present invention. Here, constituent elements identical to or corresponding to those of the first exemplary embodiment are denoted by the same reference numerals and therefore a detailed description thereof is omitted, and only dissimilar constituent elements are described here in detail.

Referring to FIG. 9, it can be seen that a vehicle according to a third exemplary embodiment of the present invention is different from the first exemplary embodiment of FIG. 1.

That is, in the foregoing first exemplary embodiment, at one side of the compression unit 20, only the first clutch unit 30 is disposed, but in the third exemplary embodiment, a second clutch unit (second clutch) 70 is further disposed between the motor unit 10 and the compression unit 20.

The rotation shaft 16 of the motor unit 10 and the rotation shaft 26 of the compression unit 20 may be coupled through the second clutch unit 70. That is, the second clutch unit 70 connects or releases the rotation shaft 16 of the motor unit 10 and the rotation shaft 26 of the compression unit 20.

The second clutch unit 70 may have a configuration similar to that of the clutch pulley 34 and the clutch plate 36 of the first clutch unit 30. For example, in the second clutch unit 70, a first element corresponding to the clutch pulley 34 is coupled to the rotation shaft 16 of the motor unit 10 to simultaneously rotate together with the rotation shaft 16, and a second element corresponding to the clutch plate 36 is coupled to slide in an axial direction to the rotation shaft 26 of the compression unit 20 to simultaneously rotate together with the rotation shaft 26. In such a case, the second element slides in an axial direction in the rotation shaft 26 of the compression unit 20 to engage with the first element and thus the second clutch unit 70 may connect the rotation shaft 16 of the motor unit 10 and the rotation shaft 26 of the compression unit 20. In the second clutch unit 70, the first element is coupled to the rotation shaft 26 of the compression unit 20 to simultaneously rotate together with the rotation shaft 26, and the second element is coupled to slide in an axial direction to the rotation shaft 16 of the motor unit 10 to simultaneously rotate together with the rotation shaft 16.

Figure 10:
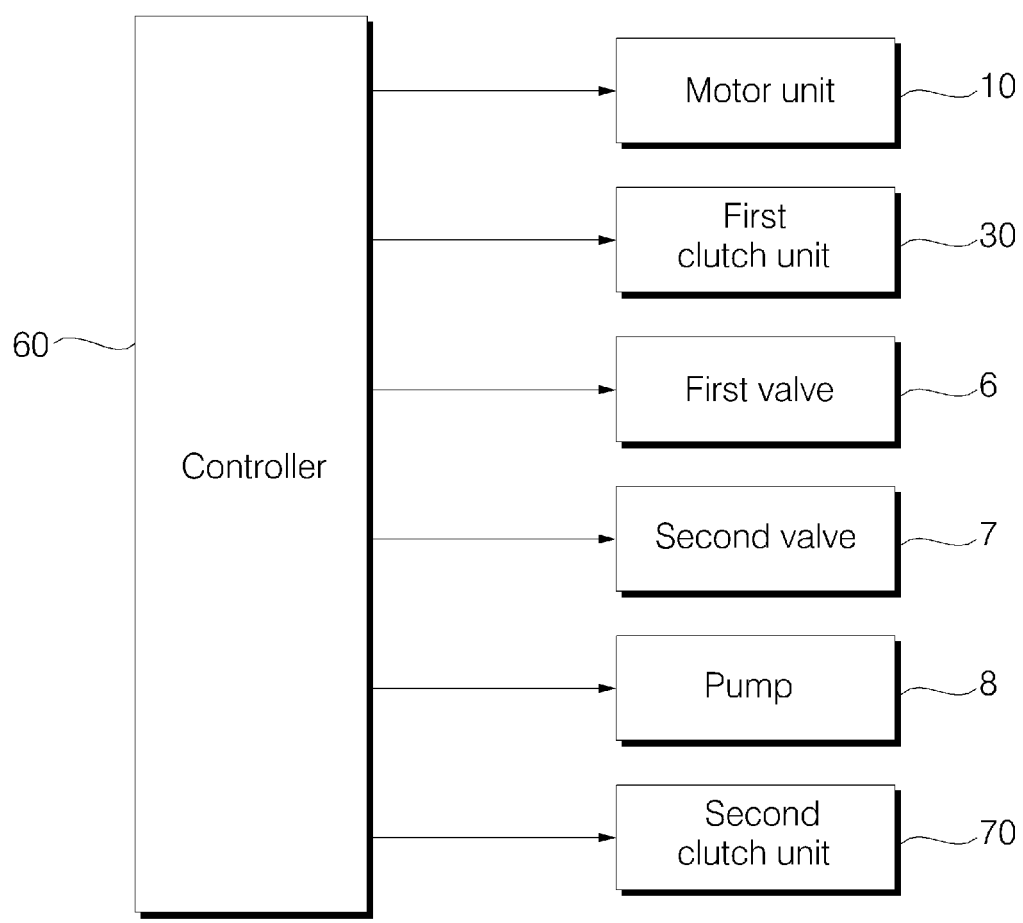
FIG. 10 is a block diagram illustrating the control of a vehicle according to a third exemplary embodiment of the present invention.

FIG. 10 is a block diagram illustrating the control of a vehicle according to a third exemplary embodiment of the present invention.

Referring to FIG. 10, the second clutch unit 70 may be controlled by the controller 60 in the same manner as the first clutch unit 30. In order for the controller 60 to control the second clutch unit 70, a first element of the second clutch unit 70 includes a second magnet 35 like the magnet installed in the clutch pulley 34 of the first clutch unit 30, and a second element of the second clutch unit 70 includes a first magnet 33 like the magnet installed in the clutch plate 36 of the first clutch unit 30.

In the third exemplary embodiment, the controller 60 controls the second clutch unit 70 to connect the rotation shaft 16 of the motor unit 10 and the rotation shaft 26 of the compression unit 20 and may thus perform the first mode to the sixth mode described in the foregoing first exemplary embodiment.

Further, in the third exemplary embodiment, when the controller 60 drives the compression unit 20 using a driving force of the engine 1, the second clutch unit 70 may perform a mode that releases a connection of the rotation shaft 16 of the motor unit 10 and the rotation shaft 26 of the compression unit 20. In such a case, compared with the first exemplary embodiment, because a load due to the compression unit 10 is not applied to the engine 1, fuel consumption can be improved.

Figure 11:
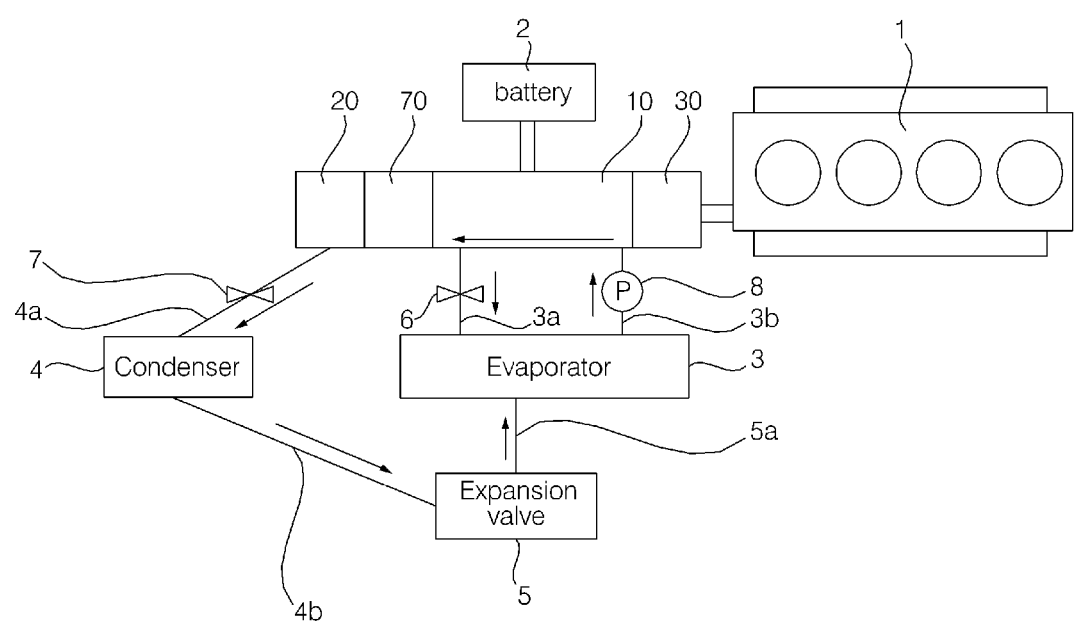
FIG. 11 is a block diagram illustrating a vehicle according to a fourth exemplary embodiment of the present invention.

FIG. 11 is a block diagram illustrating a vehicle according to a fourth exemplary embodiment of the present invention. Here, constituent elements identical to or corresponding to those of the second exemplary embodiment are denoted by the same reference numerals and therefore a detailed description thereof is omitted, and only dissimilar constituent elements are described here in detail.

Referring to FIG. 11, it can be seen that a vehicle according to a fourth exemplary embodiment of the present invention is different from the second exemplary embodiment of FIG. 8. That is, in the foregoing second exemplary embodiment, at one side of the motor unit 10, only the first clutch unit 30 is disposed, but in the fourth exemplary embodiment, a second clutch unit 70 is further disposed between the motor unit 10 and the compression unit 20. The second clutch unit 70 connects or releases the rotation shaft 16 of the motor unit 10 and the rotation shaft 26 of the compression unit 20.

In the fourth exemplary embodiment, a detailed configuration of the second clutch unit 70 that can connect or release the rotation shaft 16 of the motor unit 10 and the rotation shaft 26 of the compression unit 20 is the same as that of the foregoing third exemplary embodiment and thus a detailed description thereof will be omitted.

In the fourth exemplary embodiment, the controller 60 controls the second clutch unit 70 to connect the rotation shaft 16 of the motor unit 10 and the rotation shaft 26 of the compression unit 20 and may thus perform the first mode to the sixth mode described in the foregoing first exemplary embodiment.

Further, in the fourth exemplary embodiment, when the controller 60 charges the battery 2 by driving the motor unit 10 using a driving force of the engine 1, the second clutch unit 70 may perform a mode that releases a connection of the rotation shaft 16 of the motor unit 10 and the rotation shaft 26 of the compression unit 20. In such a case, compared with the second exemplary embodiment, because a load due to the compression unit 20 is not applied to the engine 1, fuel consumption can be improved.

While the present invention has been particularly shown and described with reference to exemplary embodiments thereof it will be understood by those skilled in the art that various changes in form and details may be made therein without departing from the spirit and scope of the invention as defined by the appended claims. Therefore, it should be understood that the foregoing exemplary embodiments are not limited but are illustrated. The scope of the present invention is represented by claims to be described later rather than the detailed description, and it should be analyzed that a meaning and the scope of claims and an entire change or a changed form that is derived from an equivalent concept thereof are included in the scope of the present invention.

What is claimed is:

1. A vehicle, comprising:
an engine;
a housing having a motor receiving space and a compressor receiving space therein;
a motor located in the motor receiving space;
a compressor located in the compressor receiving space and coupled to a rotation shaft of the motor, the compressor being configured to compress a refrigerant using at least one of a driving force of the engine and a driving force of the motor; and
a first clutch coupled to the rotation shaft of the motor or a rotation shaft of the compressor, the first clutch being configured to connect and release a driving force of the engine and a driving force of the motor;
wherein the housing comprises:
a first refrigerant inlet port to introduce a refrigerant into the motor receiving space;
a first refrigerant discharge port to discharge a refrigerant from the motor receiving space;
a second refrigerant inlet port to introduce a refrigerant to the compressor receiving space from the motor receiving space; and
a second refrigerant discharge port to discharge a refrigerant from the compressor receiving space;
a condenser to condense a refrigerant compressed in the compressor;
an expansion valve to expand a refrigerant condensed in the condenser;
an evaporator to evaporate a refrigerant expanded from the expansion valve;
a first refrigerant pipe connecting the first refrigerant discharge port and the evaporator;
a second refrigerant pipe connecting the second refrigerant discharge port and the condenser; and
a third refrigerant pipe connecting the first refrigerant inlet port and the evaporator.

2. The vehicle of claim 1, wherein the first clutch comprises:
a clutch shaft protruding outside of the housing and coupled to the rotation shaft of the motor or the rotation shaft of the compressor;
a clutch pulley rotatably coupled to the clutch shaft and connected to a flywheel of the engine; and
a clutch plate provided in the clutch shaft to connect or release the clutch shaft and the clutch pulley.

3. The vehicle of claim 2, further comprising:
a first magnet located at the clutch plate; and
a second magnet located at the clutch pulley at a location corresponding to the first magnet,
wherein one of the first magnet and the second magnet is a permanent magnet, and an other one of the first magnet and the second magnet is an electromagnet.

4. The vehicle of claim 1, further comprising:
a first valve to open and close the first refrigerant pipe; and
a second valve to open and close the second refrigerant pipe.

5. The vehicle of claim 4, further comprising:
a battery to supply a current to drive the motor and to receive a current generated by the motor; and
a controller configured to control the motor, the first clutch, the first valve, and the second valve.

6. The vehicle of claim 5, wherein the controller is configured to:
control the first clutch to not transfer a driving force of the motor to the engine,
control the motor to be driven by a current supplied from the battery, and
close the first valve and open the second valve,
if an air conditioner ON signal is input, when the engine is in a stop state.

7. The vehicle of claim 5, wherein the controller is configured to:
control the first clutch to transfer a driving force of the motor to the engine,
control the motor to be driven by a current supplied from the battery, and
open the first valve and close the second valve,
if an engine starting signal is input, when an air conditioner ON signal is input.

8. The vehicle of claim 5, wherein the controller is configured to:
control the first clutch to transfer a driving force of the motor to the engine,
control the motor to be driven by a current supplied from the battery, and
close the first valve and open the second valve, if an air conditioner ON signal is input, when the engine is operating in a state in which a present revolutions per minute (RPM) of the engine is smaller than a maximum RPM of the motor.

9. The vehicle of claim 5, wherein the controller is configured to:
control the first clutch to transfer a driving force of the motor to the engine,
control the motor to be driven by a current supplied from the battery, and
open the first valve and close the second valve,
if an air conditioner OFF signal is input, when the engine is operating in a state in which a present RPM of the engine is smaller than a maximum RPM of the motor.

10. The vehicle of claim 5, wherein the controller is configured to:
control the first clutch to transfer a driving force of the engine to the motor,
control the motor to charge the battery by generating a current by a driving force of the engine, and
close the first valve and open the second valve,
if an air conditioner ON signal is input, when the engine is operating in a state in which a present RPM of the engine is a maximum RPM or more of the motor and when a charge amount of the battery is a reference value or more.

11. The vehicle of claim 5, wherein the controller is configured to:
control the first clutch to transfer a driving force of the engine to the motor,
control the motor to charge the battery by generating a current by a driving force of the engine, and
open the first valve and close the second valve,
if an air conditioner OFF signal is input, when the engine is operating in a state in which a present RPM of the engine is a maximum RPM or more of the motor and when a charge amount of the battery is a reference value or less.

12. The vehicle of claim 5, wherein the controller is configured to:
control the first clutch to not transfer a driving force of the motor to the engine,
control the motor to be driven by a current supplied from the battery, and
close the first valve and open the second valve,
if an air conditioner ON signal is input, when the engine is operating in a state in which a present RPM of the engine is a maximum RPM or more of the motor and when a charge amount of the battery is a reference value or more.

13. The vehicle of claim 5, wherein the controller is configured to:
control the first clutch to transfer a driving force of the engine to the motor,
control the motor to charge the battery by generating a current by a driving force of the engine, and
close the first valve and open the second valve,
if an air conditioner ON signal is input, when the engine is operating in a state in which a present RPM of the engine is a maximum RPM or more of the motor and when a charge amount of the battery is a first setting value or less; and control the first clutch to not transfer a driving force of the motor to the engine, and
control the motor to be driven by a current supplied from the battery,
if a charge amount of the battery reaches a second setting value larger than the first setting value.

14. The vehicle of claim 1, further comprising a pump located in the third refrigerant pipe to pump a refrigerant from the evaporator to the motor receiving space.

15. The vehicle of claim 1, further comprising a second clutch located between the motor and the compressor to connect and release the rotation shaft of the motor and the rotation shaft of the compressor.

16. An integrated driving device, comprising:
a housing having a motor receiving space and a compressor receiving space therein;
a motor located in the motor receiving space;
a compressor located in the compressor receiving space and coupled to a rotation shaft of the motor; and
a clutch coupled to the rotation shaft of the motor or a rotation shaft of the compressor, the clutch being configured to connect and release a driving force between the motor and an external driving source,
wherein the housing comprises:
a first refrigerant inlet port to introduce a refrigerant into the motor receiving space;
a first refrigerant discharge port to discharge a refrigerant from the motor receiving space;
a second refrigerant inlet port to introduce a refrigerant to the compressor receiving space from the motor receiving space; and
a second refrigerant discharge port to discharge a refrigerant from the compressor receiving space;
a condenser to condense a refrigerant compressed in the compressor;
an expansion valve to expand a refrigerant condensed in the condenser;
an evaporator to evaporate a refrigerant expanded from the expansion valve;
a first refrigerant pipe connecting the first refrigerant discharge port and the evaporator;
a second refrigerant pipe connecting the second refrigerant discharge port and the condenser; and
a third refrigerant pipe connecting the first refrigerant inlet port and the evaporator; and
wherein the compressor is configured to compress a refrigerant:
using a driving force of the motor when the clutch is released in a first mode of operation,
using a driving force of the motor when the clutch is engaged in a second mode of operation, and
using a driving force of the external driving source when the clutch is engaged in a third mode of operation.

17. The integrated driving device of claim 16, wherein the clutch is connected to one end of the rotation shaft of the compressor, and the motor is connected to an other end of the rotation shaft of the compressor.

18. The integrated driving device of claim 16, wherein the clutch is connected to one end of the rotation shaft of the motor, and the compressor is connected to an other end of the rotation shaft of the motor.

* * * * *